(12) United States Patent
Gormley et al.

(10) Patent No.: US 9,401,744 B2
(45) Date of Patent: *Jul. 26, 2016

(54) DATA EXCHANGE INITIATED BY TAPPING DEVICES

(71) Applicant: T-Mobile USA, Inc., Bellevue, WA (US)

(72) Inventors: Georgiana Gormley, Durham, NC (US); Winston Wang, Bellevue, WA (US); Robert Buck, Bellevue, WA (US); Valerie Goulart, Seattle, WA (US); Jeff Gough, Bellevue, WA (US); Barb Brindle, Fall City, WA (US); Patrick Carney, Seattle, WA (US); Paulo Chow, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,836

(22) Filed: Dec. 22, 2014

(65) Prior Publication Data

US 2015/0180547 A1 Jun. 25, 2015

Related U.S. Application Data

(63) Continuation of application No. 14/060,587, filed on Oct. 22, 2013, now Pat. No. 8,918,050, which is a continuation of application No. 13/168,891, filed on Jun. 24, 2011, now Pat. No. 8,565,676, which is a continuation of application No. 12/672,060, filed as application No. PCT/US2008/054793 on Feb. 22, 2008, now abandoned.

(51) Int. Cl.
*H04L 25/02* (2006.01)
*H04B 5/00* (2006.01)
(Continued)

(52) U.S. Cl.
CPC ............ *H04B 5/0031* (2013.01); *G06F 1/1684* (2013.01); *G06F 1/1694* (2013.01);
(Continued)

(58) Field of Classification Search
CPC ......... H04L 25/02; H04L 67/10; H04L 67/38; H04L 1/5865; H04L 12/5895; H04L 2209/80; H04L 29/08189; H04L 51/12; H04L 51/20; H04B 14/00; H04B 1/38; H04B 7/26; H04B 5/0031
USPC ............... 455/41.1, 41.2, 519, 214, 224, 263, 455/336; 710/16
See application file for complete search history.

(56) References Cited

U.S. PATENT DOCUMENTS

| 5,636,264 A | 6/1997 | Sulavuori et al. |
| 6,434,363 B2 | 8/2002 | Rinne et al. |

(Continued)

FOREIGN PATENT DOCUMENTS

WO    2009105115    8/2009

OTHER PUBLICATIONS

Bump technologies, Home of Bump (tm) for iPhone, Bump Technologies LLC, Copyright 2009, 1 page.

(Continued)

*Primary Examiner* — Minh D Dao
(74) *Attorney, Agent, or Firm* — Perkins Coie LLP

(57) ABSTRACT

A user can initiate the transmission of data on a mobile device by making physical contact with another device. The physical contact can be any type of physical touch that is referred to as a "tap" or "tapping." When a tap is detected by a device, the device may initiate near field communication (NFC) with the other tapping device. NFC may be used to communicate data between the two devices, or NFC may be used to exchange sufficient information to allow the devices to establish a communication channel via another communication link. In some embodiments, an NFC-enabled mobile device can be used to gather group data relating to users having mobile devices that are within NFC range of one another and which initiate the aggregation of group data by the tapping of three or more devices.

20 Claims, 5 Drawing Sheets

(51) Int. Cl.
*H04M 1/2745* (2006.01)
*H04M 1/725* (2006.01)
*H04W 8/00* (2009.01)
*G06F 1/16* (2006.01)
*H04W 24/00* (2009.01)
*H04W 48/16* (2009.01)
*H04W 76/02* (2009.01)
*H04W 84/10* (2009.01)
*H04W 92/18* (2009.01)
*H04B 17/23* (2015.01)

(52) U.S. Cl.
CPC ............ *H04B5/0012* (2013.01); *H04B 5/0068* (2013.01); *H04M 1/274516* (2013.01); *H04M 1/7253* (2013.01); *H04W 8/005* (2013.01); *G06F 2200/1636* (2013.01); *H04B 17/23* (2015.01); *H04M 2250/04* (2013.01); *H04M 2250/12* (2013.01); *H04M 2250/64* (2013.01); *H04W 24/00* (2013.01); *H04W 48/16* (2013.01); *H04W 76/02* (2013.01); *H04W 84/10* (2013.01); *H04W 92/18* (2013.01)

(56) References Cited

U.S. PATENT DOCUMENTS

| | | | |
|---|---|---|---|
| 6,608,551 | B1 | 8/2003 | Anderson et al. |
| 6,615,023 | B1 | 9/2003 | Ehrensvard |
| 6,664,891 | B2 | 12/2003 | Davies et al. |
| 6,859,650 | B1 | 2/2005 | Ritter |
| 6,874,037 | B1 | 3/2005 | Abram et al. |
| 7,034,684 | B2 | 4/2006 | Boman et al. |
| 7,082,316 | B2 * | 7/2006 | Eiden et al. .............. 455/519 |
| 7,130,608 | B2 | 10/2006 | Hollström et al. |
| 7,139,806 | B2 | 11/2006 | Hayes et al. |
| 8,340,577 | B2 * | 12/2012 | Griffin et al. ............. 455/41.2 |
| 8,565,676 | B2 * | 10/2013 | Gormley et al. ........... 455/41.1 |
| 8,918,050 | B2 | 12/2014 | Gormley et al. |
| 2002/0128030 | A1 * | 9/2002 | Eiden et al. .............. 455/519 |
| 2003/0190138 | A1 | 10/2003 | Yuen et al. |
| 2004/0203381 | A1 * | 10/2004 | Cahn et al. .............. 455/41.2 |
| 2005/0248423 | A1 | 11/2005 | Qian et al. |
| 2006/0040692 | A1 | 2/2006 | Anttila et al. |
| 2006/0090067 | A1 * | 4/2006 | Edmonds et al. .......... 713/159 |
| 2006/0156388 | A1 * | 7/2006 | Stirbu et al. ................ 726/4 |
| 2006/0219776 | A1 | 10/2006 | Finn |
| 2006/0251256 | A1 * | 11/2006 | Asokan et al. ............ 380/270 |
| 2006/0282556 | A1 * | 12/2006 | Hanson et al. ............. 710/16 |
| 2006/0294582 | A1 | 12/2006 | Linsley-Hood et al. |
| 2007/0005609 | A1 * | 1/2007 | Breed ..................... 707/10 |
| 2011/0175879 | A1 * | 7/2011 | Tanaka ................... 345/211 |

OTHER PUBLICATIONS

"Master Table of Contents & Compliance Requirements," Specification of the Bluetooth System, Version 2.1 + EDR, Jul. 26, 2007, 1420 pages.
"Mobile NFC Technical Guidelines," GSMA, Version 1.0, Apr. 2007, 36 pages.
"Motorola NFC Applications Discussion with T-Mobile," Motorola, Apr. 6, 2005, 10 pages.
"Near Field Communication in the real world-part II,"Innovision Research & Technology plc, Dec. 13, 2006, 13 pages.
"Near-Field Magnetic Communication Properties," White Paper, AURA Communications, Inc., www.auracomm.com, Copyright 2003, 5 pages.
"NFC and mobile payments," Mar. 2005, Nokia, 32 pages.
"NFC Data Exchange Format (NDEF)," Technical Specification, NFC Forum NDEF 1.0, Jul. 24, 2006, 25 pages.
"Nokia, Philips and Sony establish the Near Field Communication (NFC) Forum," Mar. 18, 2004, 3 pages.
Archangela, H., "Samsung M3510 to Feature Accelerometer," Phone Magazine, Jul. 8, 2008, 1 page.
Brad, "Accelerometer in Cell Phone for Emergencies," Brad Ideas, Mar. 29, 2004, http://ideas.4brad.com/archives/000056.html, [Last Accessed Sep. 23, 2010], 2 pages.
Haselsteiner, Ernst et al., "Security in Near Field Communication (NFC)," Philips Semiconductors, Printed handout Workshop on RFID Security RFIDSec 06, Jul. 2006, 11 pages.
International Search Report and Written Opinion, International Application No. PCT/US2008/054793, filed on Feb. 22, 2008, Date of Mailing Jul. 30, 2008, 11 pages.
Partridge, Kurt et al., "TiltType: Accelerometer-Supported Text Entry for Very Small Devices," In Proceedings of UIST 2002, ACM Press, pp. 201-204.

* cited by examiner

DATA EXCHANGE INITIATED BY TAPPING DEVICES

CROSS-REFERENCE TO RELATED APPLICATION

This application is a continuation of U.S. patent application Ser. No. 14/060,587, now U.S. Pat. No. 8,918,050, filed Oct. 22, 2013 and titled DATA EXCHANGE INITIATED BY TAPPING DEVICES; which is a continuation of U.S. patent application Ser. No. 13/168,891 filed Jun. 24, 2011, now U.S. Pat. No. 8,565,676 and titled DATA EXCHANGE INITIATED BY TAPPING DEVICES; which is a continuation of U.S. patent application Ser. No. 12/672,060, filed Feb. 3, 2010 and titled DATA EXCHANGE INITIATED BY TAPPING DEVICES; which is a U.S. National Stage application of International Application No. PCT/US08/54793, filed Feb. 22, 2008 and titled DATA EXCHANGE INITIATED BY TAPPING DEVICES; all of which are hereby incorporated by reference in their entireties.

BACKGROUND

The term "near field communication" (or "NFC") generally encompasses short range wireless technology using magnetic field induction, often but not exclusively using the globally available and unlicensed radio frequency band of 13.56 MHz (see ISO/IEC 18092/ECMA-340 and ISO/IEC 21481/ECMA-352). NFC builds upon the same basic technology of proximity RFID tags and contactless smartcards. Such magnetic field induction techniques are a deviation from conventional transmitting devices that produce radio frequency (RF) plane waves that propagate through free space. In NFC, a transmitting device uses a transducer to modulate signals in a magnetic field that remains relatively localized around the device. Information is communicated or coupled through the magnetic field by sensing time varying fields or fluctuations using a similarly designed transducer in a receiving device. Although a small amount of RF energy inevitably flows from the transducer in the transmitting device, the majority of the energy is stored in the form of a magnetic field.

Exploiting these properties, NFC-enabled mobile devices can provide certain advantages that are not available in purely RF-based communications. These advantages arise from the fact that the signals produced in NFC attenuate as a function of $1/r^6$, which is much larger than the signals associated with RF fields (a function of $1/r^2$). This large amount of attenuation, gives NFC a relatively short communication range or communication "bubble" of about 5-10 cm. Outside of this bubble, communications are very difficult to intercept or eavesdrop on. This large attenuation also prevents NFC-enabled mobile devices from being as susceptible to overlapping frequency spectra from other devices. Thus, two or more devices can sidestep the more complicated set up procedures associated with traditional short range wireless communications (e.g., Bluetooth or Wi-Fi). For example, NFC-enabled mobile devices do not need to identify a secure channel or a common frequency band on which to communicate.

NFC-enabled devices can be used in many applications, such as electronic payment, information retrieval, and short range data transmitting. There are generally two different kinds of NFC devices: active or passive. An active NFC device provides power to an internally located transducer. When modulated, the transducer creates a signal in a magnetic field and this signal can in turn be received by a target device. Passive devices, on the other hand, use the broadcast signal from an active device for power and can therefore only communicate when they are in the presence of an active device. In general, NFC-enabled devices are active devices that include a transducer and an NFC-enabled chipset. For example, a mobile device can function as a smart card that can be used for electronic payment or as a card reader that can be used to read information from NFC tags (embedded in a poster, a kiosk, or other type of stationary device). NFC-enabled mobile devices can also set up short range wireless links with other devices. Despite being slower than some traditional short range communications, NFC can transfer information (e.g., a text or picture file) at respectable speeds of up to 424 KB/s. If larger amounts of data need to be transferred, a device can use NFC to set up an RF link. For example, Bluetooth v2.1+EDR supports session set up using an out of band (OOB) NFC link to exchange authentication, encryption, and other types of session information (see, Specification of the Bluetooth System, Jul. 26, 2007). Such OOB links can eliminate complicated and time-intensive setup and encryption procedures.

Although NFC is a very promising technology, current attempts to integrate NFC within a device have not completely addressed at least some of problems related to using devices as a short range communication tool. In particular, NFC by itself does not alleviate the often cumbersome and awkward task of entering commands and data into a device. For example, some cellular telephones are enabled with NFC capability. Such devices tend to be compact, having small display screens and limited sized keypads. When exchanging data between such devices, users need to use these compact displays and keypads to access menus and input a variety of commands before data will begin to transmit. For example, transmitting electronic contact information to another user can be an involved task. To find contact information, users typically have to use their keypad to navigate to a menu that displays all of their contacts and then use the keypad again to select an individual contact from this menu. Once the appropriate contact has been located, users need to select the contact and then indicate that they want to transmit the contact data to another device. To do this, users typically have to navigate through additional menus and input further keypad entries to initiate data transmission. Operating the compact display and keypad can be tedious and frustrating, especially when keys are accidentally depressed. As another example, it can also be difficult to use mobile device displays and keypads to organize and arrange data on a mobile device. For example, users can use the short range communication features on their mobile devices to collect hundreds or even thousands of electronic contacts. Some of these contacts may be electronic business cards (e.g., collected at a business conference or a seminar) and other contacts may be those of personal acquaintances (e.g., friends, family members, members of a sports club, etc.). Despite having acquired this data, given the nature of mobile device displays and keypads, it is difficult for a user to present or recall this information in a meaningful way (e.g., organized by type, group, date, etc.). Thus, even though NFC can allow mobile devices to collect exhaustive amount of data, it still leaves the user with the Herculean task of organizing and arranging the data after it has been collected.

DETAILED DESCRIPTION

Figure 1A:
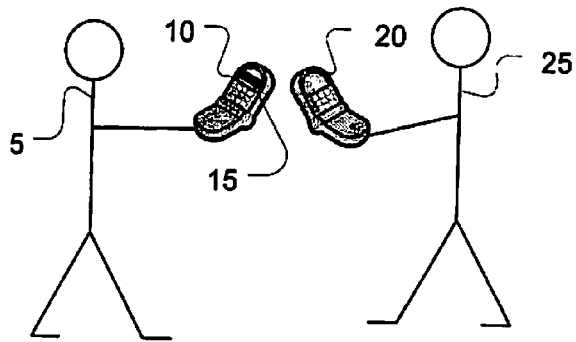
FIGS. 1A-1D are perspective diagrams of two users "tapping" two or more near field communication (NFC) enabled devices together to initiate data transmission and/or to activate NFC on an individual device.

Various systems and methods for initiating near field communication (NFC) and data transfer between devices are described herein. In some embodiments, a user can initiate the transmission of data on a mobile device by making physical contact with another device. The physical contact can be any type of physical touch, and is generally referred to herein as a "tap" or "tapping." When a tap is detected by a device, the device may initiate NFC with the other device. The NFC channel may be used to communicate data between the two devices, or the NFC channel may be used to exchange sufficient information to allow the devices to establish an alternate communication channel via a wireless network (such as GPRS, EDGE or UMTS) or other communication link. The use of a tap to initiate communication offers users a less complicated and more intuitive manner to exchange data with other devices.

In some embodiments, an NFC-enabled mobile device can be used to gather group data relating to users having mobile devices that are within NFC range of one another and which initiate the aggregation of group data by the tapping of three or more devices. The group data can include, for example, user phone numbers, email addresses, business and personal data, as well as a myriad other types of information. The group data can be recalled and used by the devices at a later time, for example to collectively send an email or text message to each user address associated with the group data.

The term "mobile device" may encompass any of a myriad of communication devices such as cellular phones, personal digital assistants, portable computers, mini computers, programmable consumer electronics, and so on. Such mobile devices can include a central processing unit, memory, input devices (e.g., keypads and input buttons) and output devices (e.g., display devices). Mobile devices can also include hardware and operating instructions stored in memory for wirelessly transmitting and receiving data according to one or more wireless protocols in addition to NFC-based data exchanges. Such protocols include short range protocols (e.g., Bluetooth, Wi-Fi, Ultra-wideband, and ZigBee) and radio-access network protocols (e.g., GSM, GPRS, EDGE, UMTS and CDMA).

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

NFC Initiation via Tapping

In some embodiments, users can tap an NFC-enabled mobile device with another NFC-enabled device, initiating data exchange using a limited amount of manual input. The user selects data to be transferred as a result of a tap. Once the data has been identified for transfer, users can initiate the transfer by tapping the mobile device with the other device. An NFC channel is used for purposes of communicating the data or for purposes of exchanging sufficient information to allow the data to be communicated via an alternate communication channel, such as a wireless channel (GPRS, EDGE, UMTS) or other communication link. The other device receives the incoming data and may transmit data in response to the received data. The other device may be a mobile device, or it may be a non-mobile device such as a kiosk, ATM, desktop computer, appliance, picture frame and other programmable consumer electronic or other communication-enabled device.

FIGS. 1A-1D are perspective diagrams illustrating the tapping of two or more NFC-enabled devices together to initiate data exchange between the devices. In FIG. 1A, a first user 5 having a first NFC-enabled mobile device 10 selects data 15 that is to be transmitted to a second NFC-enabled mobile device 20 of a second user 25. The user may select data to be exchanged by making the data visible on the mobile device display, by selecting one or more data files from a menu or list of data files, by depressing individual keys that have pre-assigned association with specific data (e.g., in a similar fashion to how speed-dial is assigned to a specific key on a phone), or by specifying one or more rules regarding the type of data that may be transferred in the absence of previously-selected data. FIGS. 2A-2F depict various user interfaces that allow data to be selected by a user for transmission. The data may be one or more pieces of information (such as contact information 200), media (such as a song 205, image 210, text, music, or video), or application or other data files 215. The user 5 can select the data 15 in a variety of ways, such as by highlighting an item indicative of the file on a menu (FIGS. 2A, 2B, 2D), by making the contents of the data 15 visible on the display of the mobile device (FIG. 2C), by creating one or more rules that reflect the data that should be automatically transmitted in the event of a tap (FIG. 2E), or by assigning one or more softkeys to certain data (FIG. 2F) and pressing the appropriate softkey prior to, during, or immediately after the tap that initiates the transmission. The selection of data may be made in particular applications, such as in an address book, email, or media player application, or from a file management system present on the mobile device.

Figure 1B:
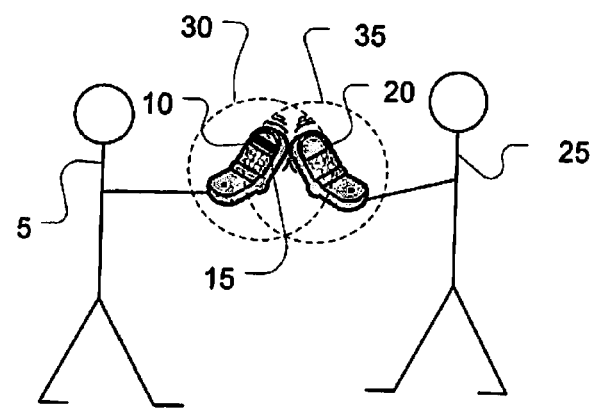
Figure 3:
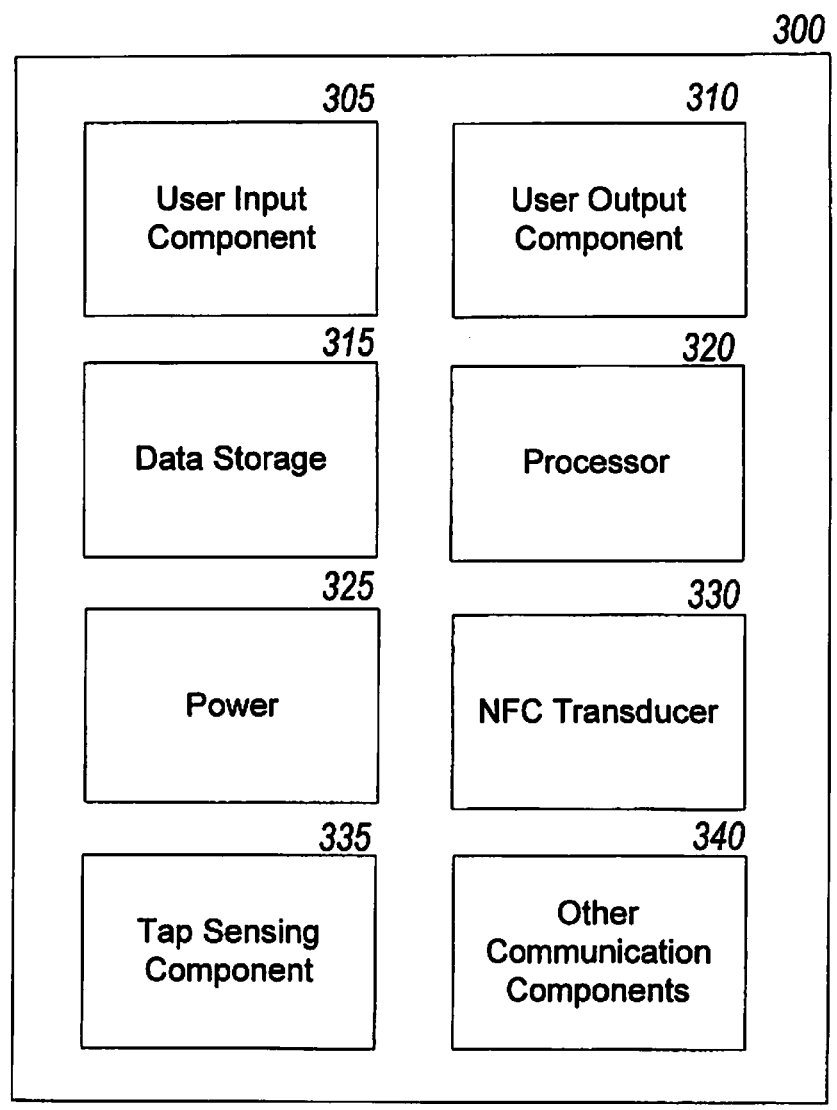
FIG. 3 is a block diagram of representative components within an NFC-enabled mobile device.

As shown in FIG. 1B, after selecting data to transmit, the user 5 can transmit the file by tapping the first mobile device 10 with the second mobile device 20. The first mobile device has an NFC range 30 that overlaps an NFC range 35 of the second device. FIG. 3 is a block diagram of representative components within an NFC-enabled mobile device 300. The device contains a power subsystem 325, data storage 315 to store programs and data, and a processor 320 to run an operating system and applications to implement the disclosed functionality. A user interfaces with the device using a user input component 305 (e.g., keypad, touchscreen, voice recognition system) and a user output component 310 (e.g., speaker, screen). To establish an NFC channel, the mobile device 300 includes a tap sensing component 335 and an NFC transducer 330. To establish other communication channels, the mobile device may include one or more other communication components 340, such as Bluetooth, Wi-Fi, Ultra-wideband, ZigBee, GSM, GPRS, EDGE, UMTS and CDMA components.

Various technologies may be used to implement the tap sensing component 335 in a mobile or a non-mobile device. For example, the tap sensing component may be a capacitive switch that is incorporated into the external cases of devices and which causes activation by slight contact between contact points located on each of the devices. As another example, the tap sensing component may be an accelerometer sensing element that causes activation only after a certain threshold of impact force or momentum change is detected within the device. Those skilled in the art will appreciate that other types of touch-detection technologies, such as resistive switches, may also be used in devices to detect a tap. The tap can be any type of physical contact that occurs between the devices. The type of contact that is made between the devices is related to the type of tap sensing component included with the devices. For example, devices with capacitive switches may require two devices to merely be brushed together, whereas devices with accelerometers may require a more vigorous tap between two devices. In some embodiments, when the devices are tapped together the NFC transducers 330 within the devices are activated. Activating and de-activating NFC components in such a manner conserves battery power on the devices. In other embodiments, the NFC components within the devices may always be activated, but not communicating with one another until a tap is detected.

When a tap is detected by the tap sensing component, the selected data 15 is transmitted without any further input from the user 5 or the user 25. The data may be transmitted between the mobile devices 10, 20 using the NFC channel. That is, after the tap has occurred, certain handshaking occurs between the devices and the data is transmitted using the available NFC channel. In some embodiments, the NFC channel is used to exchange addressing and protocol information sufficient to enable the devices to then transmit the data via an alternate communication channel (e.g., Bluetooth, Wi-Fi, Ultra-wideband, ZigBee, GSM, GPRS, EDGE, UMTS and CDMA). For example, if both of the devices are mobile phones, the devices may exchange device addresses over the NFC channel, and then may initiate the transfer of data via an alternate wireless communication channel that the phones utilize for voice and/or data transfer. It will be appreciated that multiple communication channels may be used to complete a single data transfer. For example, the devices may initiate data communication via an NFC channel, but when the devices are moved apart and the NFC channel is broken, the devices may continue the transfer of data via the wireless communication channel. If the devices are subsequently brought back within NFC communication range, the devices may terminate the transfer of data via the wireless communication channel and may resume transmission via the NFC channel. It is generally advantageous to transmit as much data as possible via the NFC channel, however, as doing so preserves the capacity of the wireless communication channel for other uses. In some embodiments, the communication channel that is used will depend on the quantity of data being transferred. Smaller amounts of data may be transmitted via the NFC channel, whereas larger amounts of data may be transmitted via the wireless or other communication channel.

Figure 1C:
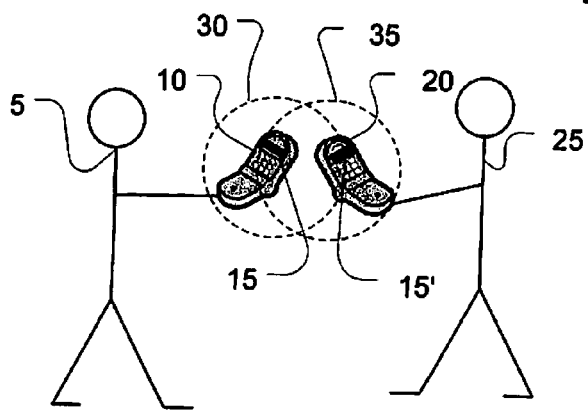

FIG. 1C shows the data 15' after it has been transferred from the first mobile device 10 to the second mobile device 20. Assuming that at least user 5 or user 25 has selected a file, transfer of the data 15 occurs immediately after the mobile devices 10, 20 are tapped. Communication between the mobile devices can be carried out in a half-duplex mode, where the first mobile device 10 is an initiating device and the second mobile device 20 is a target device. For example, after the mobile devices are tapped together, the first mobile device 10 first determines whether an NFC channel is open (i.e., no other devices are communicating within the first NFC range 30). If the channel is open, the first mobile device 10 transmits a message. In some embodiments, both of the mobile devices may attempt to exchange files with one another. In this case, the mobile devices can be configured to negotiate which of the mobile devices should be the first to transmit and which of the mobile devices should wait to receive a transmission.

Figure 1D:
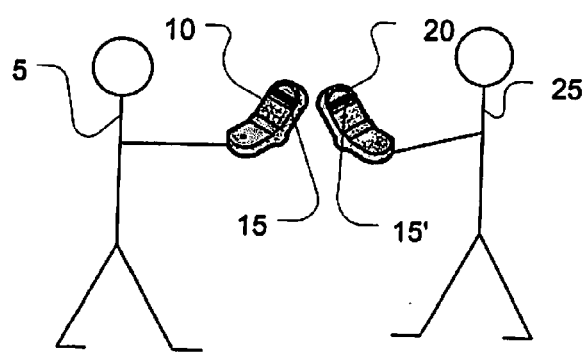
Figure 2A:
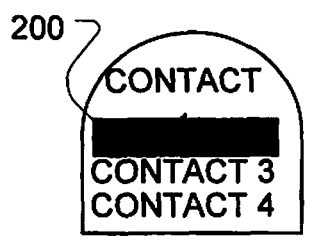
FIGS. 2A-2F are representative user interfaces on NFC-enabled devices that depict various types of data that may be exchanged as a result of device tapping.
Figure 2B:
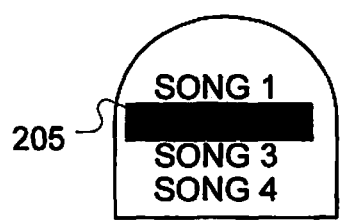
Figure 2C:
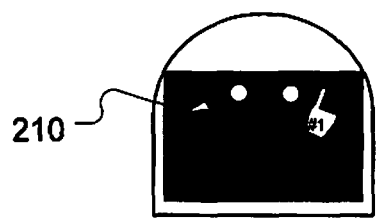
Figure 2D:
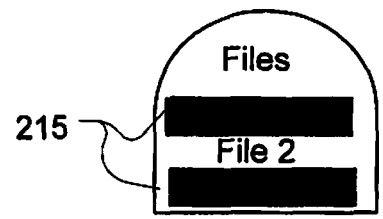
Figure 2E:
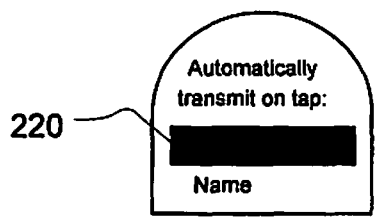
Figure 2F:
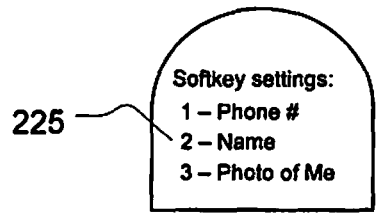

As depicted in FIG. 1D, once the data has been transmitted via the NFC channel, or information sufficient to allow the data to be transmitted between the devices has been exchanged via the NFC channel, the NFC channel is deactivated. In some embodiments, the mobile devices deactivate NFC by indicating to one another that communications have finished. Alternatively, mobile devices could include individual timer circuits that deactivate NFC after a pre-determined amount of time has elapsed from the initial tap or from the last communication received from the other device. While the communication is depicted between two mobile devices in FIGS. 1A-1D, it will be appreciated that the same techniques may be used to transmit data between a mobile device and a non-mobile device.

Various enhancements may be implemented on a mobile or non-mobile device related to the tap feature. In some embodiments, a user may be allowed to lock the tap feature of the device, preventing the device from transmitting and/or receiving any data as a result of a tap. In some embodiments, the device may produce visible and/or audible indicators when it has been tapped and data communication is about to start. For example, when tapped, the display of the device can brighten or the device can produce a click, a tone, or other type of sound (e.g., similar to how a digital camera creates a mechanical clicking sound).

In some embodiments, a user may define further limitations on the data that is communicated as a result of a tap. For example, the user may specify that data be transmitted only if the receiving device is associated with a known individual (e.g., business associate, friend, family member). Prior to initiating data transmission and as part of a handshake process, the transmitting device would therefore receive identifying information from the receiving device and compare the received identification with a list of authorized individuals that are maintained on the transmitting device. If the receiving device is found to be associated with an authorized individual, then the transmitting device will continue with the data transmission. If the receiving device is not associated with an authorized individual, then the transmitting device will not continue with the data transmission.

In some embodiments, the pattern of taps between two devices may cause different data to be communicated between the devices. For example, two friends may specify that certain pictures may only be shared if a defined pattern of taps is first detected. The pattern may be a simple pattern (e.g., three taps in quick succession, two quick taps followed by a third delayed tap) or a complex pattern (e.g., the rhythm of "shave and a haircut"). In addition to causing certain data to be transmitted, the received pattern of taps may also cause a process to be kicked-off on the receiving device. For example, the receiving device may receive a transfer of images and may cause the images to then be uploaded to a printing service.

In some embodiments, rather than specifying the data that is to be transmitted prior to or during the tap (e.g., by default settings, by manual selection, by softkey), the user may select the data that is to be transmitted to another device after the tap.

That is, if a user taps another device without having specified data that is to be transmitted, following the tap an interface may be displayed to the user to allow the user to select the data that is to be transmitted to the other device. The user may select the appropriate data to transmit using any of the methods described herein, and the data is then transmitted between devices using a NFC or other communication channel. Although having the user specify the data to transmit after the tap removes some of the spontaneity associated with tapping, the initiation of data transfer by tapping is still more efficient that prior art methods of communicating data.

Group Data Sharing Via NFC

In some embodiments, three or more users can compile group data by tapping their NFC-enabled mobile devices together within a certain period of time that is preset or defined by a user. The group data is automatically compiled and provided to one or more users within the group. At a later time, the group data can be used to re-establish contact with an individual within the group or the group collectively. As compared to conventional and manual methods of organizing data, tapping mobile devices allows users to more easily create groupings and associations with other users. For example, a group of users can gather group data by tapping their devices to obtain electronic business cards. The business card data can include email addresses, phone numbers, company info and other types of data relating to each of the users. As another example, a group of newly acquainted tourists can use NFC-enabled mobile devices to share digital photos. At the same time that the tourists are transferring photo files, their mobile devices can also be automatically gathering group data that allows the tourists to re-connect after their vacation. For example, after returning home the tourists can use the group data to send additional photos to the collective group or to individuals within the group.

Figure 4:
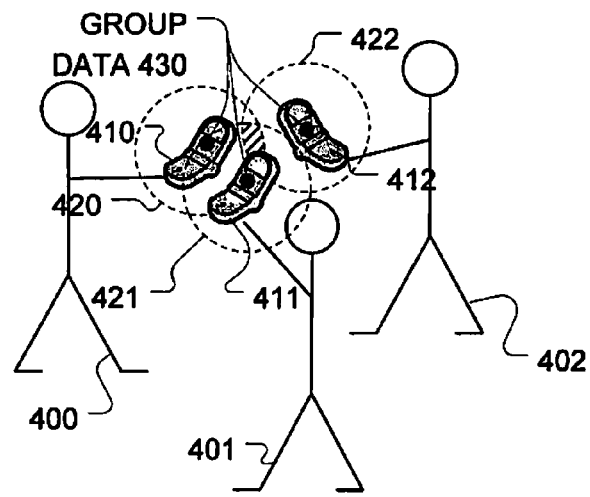
FIG. 4 is a perspective diagram of a group of users tapping NFC-enabled mobile devices to initiate data transmission.
Figure 5:
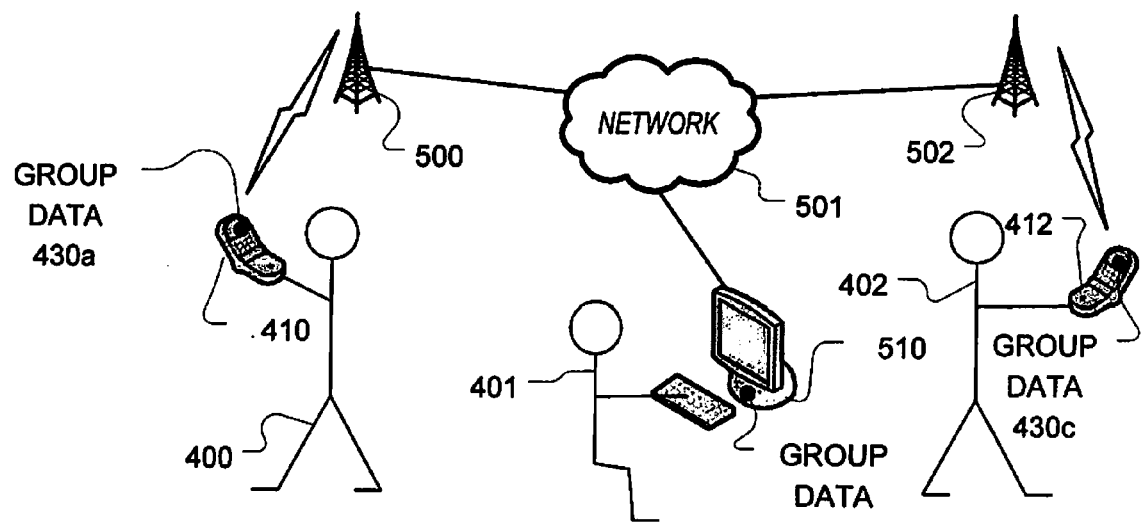
FIG. 5 is a perspective diagram of a group of users subsequently sharing data as a result of relationships established by tapping NFC-enabled mobile devices.
Figure 6:
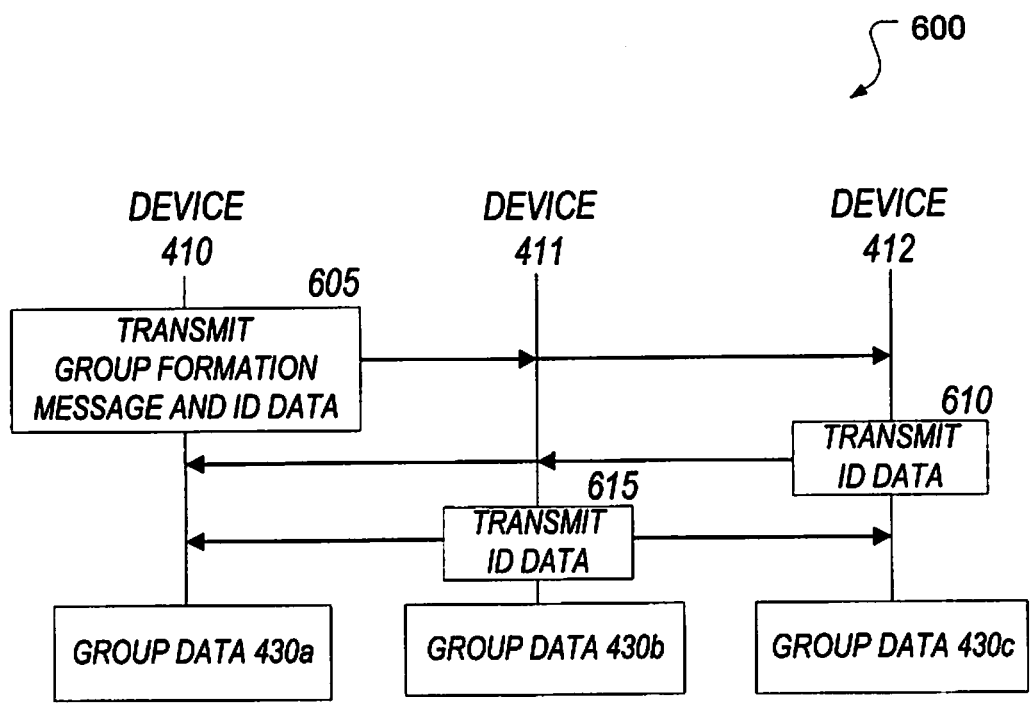
FIG. 6 is a data communication diagram depicting the transmission of data between multiple NFC-enabled mobile devices.

FIGS. 4-6 are diagrams illustrating the creation of group data using NFC. FIG. 4 shows first, second, and third users 400, 401, 402 having, respectively, NFC-enabled mobile devices 410, 411, 412. The mobile devices 410, 411, 412 have corresponding NFC ranges 420, 421, 422. When the mobile devices have been tapped together and are within NFC range of one another (i.e., the NFC ranges 420, 421, 422 are overlapping), the devices can automatically compile group data 430 by acquiring data about each other. For example, mobile device 410 can compile group data 430a, mobile device 411 can compile group data 430b, and mobile device 412 can compile group data 430c. The group data can be stored within individual mobile devices and used, as described herein, to re-establish communications with each of the other users either individually or collectively.

Various techniques may be used to define how close in proximity a tap with another mobile device must be in order for the other device to join a group. In some embodiments, a mobile device may have a preset time period (e.g. 15 seconds) after each tap during which it assumes that a subsequent tap with another mobile device should be aggregated with the preceding tap or taps to form a group. In this fashion, a user may sequentially tap in close proximity the mobile devices of others in order to form a group. In some embodiments, a user may enter an initial command before starting to tap other mobile devices that should be in a group and a final command after tapping the last mobile device of a user that should be in a group. Any taps that occur with other mobile devices after the initial command and before the final command would therefore fall within the group. In some embodiments, only a single tap with another mobile device is required to start the group formation process, but the mobile device communicates with all other devices that are within range of NFC and aggregates the information from any of the mobile devices with which it is able to communicate in order to form a group. Those skilled in the art will appreciate that other automated or manual techniques may be used to form groups.

FIG. 5 shows the users 400, 401, 402 re-establishing contact with one another at a later time. The first user 400 is using the mobile device 410 in communication with a radio access network 500, the second user 401 is using a computer 510 coupled to an IP network 501, and the third user 402 is using the mobile device 412 in communication with a radio access network 502. The radio access networks 500, 502 are coupled to the IP network 501 via public and/or private networks, allowing the users to establish communication with one another (e.g., via e-mail, instant messaging, text or SMS messaging, or by voice or video communications). For example, the first user 400 can use the group data 430a stored on the mobile device 410 to send a text message to each or either of the users 401, 402. After transferring the group data to the computer 510, the second user 401 can use the group data 430b to email a file to each or either of the users 400, 402. Or, the third user 402 can use the group data 430c on the mobile device 412 to establish a group call with the users 400, 401.

Once group data 430 has been aggregated and provided to each of the mobile devices, a user may access the group data and add members, modify members, or remove members from the group. In some embodiments, the group data may be uploaded to a website or other service that would allow a user to easily access the group data via a computer or via the mobile device. The group data may be exported to social networking sites, such as Facebook, Myspace, LinkedIn, Yahoo! Groups, or similar sites, where the group data may be used to create new social networks or extend existing social networks. The group data may also be used to construct mailing lists to facilitate the distribution of emails or SMS messages.

FIG. 6 is a timing diagram that illustrates an embodiment of data flows between the mobile devices 410, 411, 412 when the devices are within NFC range of one another. To compile group data, any one of the mobile devices 410, 411, 412 can initiate a group data exchange by tapping two or more of the other devices. FIG. 6 shows the first device 410 initiating a group data exchange by tapping mobile devices 411 and 412 and transmitting a group formation message 605 to each of the devices via an NFC signal. The transmitted group formation message 605 includes an indicator (e.g., a parameter in a header) that group data should be gathered from all mobile devices that are tapped or alternatively that are within range of device 410. The group formation message may be automatically generated by the mobile device once it detects two devices tapped in close proximity, or the user can indicate to the mobile device 410 that group data should be compiled prior to tapping the other devices (e.g., by entering such input on the keypad of the mobile device). In addition to indicating that group data should be compiled, the transmitted group formation message 605 can also include identification data associated with the first mobile device 410 or the user 400, for example the user's phone number, email-address, business or personal information, etc.

When the mobile devices 411 and 412 receive the group formation message 605, the message informs the receiving devices that group data is being compiled. Accordingly, mobile device 412 transmits identification data 610 to mobile devices 410 and 411, and mobile device 411 transmits identification data 615 to mobile devices 410 and 412. When each mobile device receives identification data from another device, it compiles at least a portion of the received data to create the group data 430. Specifically, mobile device 410 compiles data received from mobile devices 411 and 412 to create group data 430*a*, mobile device 411 compiles data received from mobile devices 410 and 412 to create group data 430*b*, and mobile device 412 compiles data received from mobile devices 410 and 411 to create group data 430*c* (each set of group data implicitly includes, of course, information associated with the mobile device that receives the group data). Once group formation is complete, a group termination message (not shown) may be sent to the other mobile devices to indicate that no further mobile devices are to be accepted into the group.

In contrast to each of the mobile devices having to send identification information to all of the other mobile devices in order to compile group data, in some embodiments one of the mobile devices may be designated as a master device to collect all group data. The master mobile device receives identification data from all of the other mobile devices in the group, compiles the received identification data to create the group data, and transmits the group data to the other mobile devices. The group data may be transmitted via an NFC channel, or it may be transmitted via an alternate communication channel.

One example application that may utilize group data is a media application that allows media sharing. The first user 400 can use the mobile device 410 to capture a picture and transmit the picture file to the mobile devices 411 and 412 using NFC. The picture file may be accompanied by the group formation message and corresponding user identification data. The mobile devices 411 and 412 respond with identification data, thereby instantly creating a group of individuals (e.g., individuals traveling together, individuals that may have met while at a sporting event, dinner, or a trip) that can subsequently share pictures of interest. In some embodiments, the picture file could be used as the group identifier, such as a graphical icon that is displayed in a contact list. The contact list could be programmed, for example, so that upon clicking such an icon, a text message having the addresses of the other users is included in the "To:" field of the message. In other embodiments, group data can be used to set up other types of distributions groups for various services, such as a T-Mobile® myFaves association for wireless communication services.

CONCLUSION

From the foregoing, it will be appreciated that specific, representative embodiments have been described herein for purposes of illustration, but that various modifications may be made to these embodiments including adding and/or eliminating particular features. For example, many of the features relating to NFC-enabled mobile devices are applicable to NFC-enabled stationary devices. Further, while advantages associated with certain embodiments have been described in the context of those embodiments, other embodiments may also exhibit such advantages, and not all embodiments need necessarily exhibit such advantages to fall within the scope of the invention.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for receiving data at a mobile device, the system comprising:

a detection component incorporated into the mobile device, wherein the detection component is configured to:
  detect a physical proximity between the mobile device and multiple other mobile devices; and
  generate signals indicative of the detected physical proximity between the mobile device and the multiple other mobile devices;
a near field communication transponder; and
a controller coupled to the detection component and to the near field communication transponder, wherein the controller is configured to:
  receive the signals indicative of physical proximity between the mobile device and the multiple other mobile devices and, in response,
  initiate a group data exchange and transmit a group formation message to each of the multiple other mobile devices,
  enable the near field communication transponder to receive data messages initiated by the multiple other mobile devices that are part of the group data exchange,
  wherein the group formation message facilitates creation of communication channels between the mobile device and the multiple other mobile devices over which the data is to be received.

2. The system of claim 1, wherein the controller is further configured to enable creation of the communication channels between the mobile device and the multiple other mobile devices over which the data is to be received.

3. The system of claim 1, wherein the detection component comprises one or more of a capacitive switch, a resistive switch, or an accelerometer.

4. The system of claim 1, wherein the communication channels include a near field communication channel and the data is received via the near field communication transponder.

5. The system of claim 4, wherein the controller is further configured to enable creation of a second communication channel between the mobile device and at least one of the multiple other mobile devices over which the data is to be received.

6. The system of claim 5, wherein the controller is further configured to:
  detect a break in the near field communication channel; and
  commence reception of the data via the second communication channel.

7. The system of claim 5, further comprising:
a short range communication component configured to communicate with at least one of the multiple other mobile devices via a short range protocol,
wherein the second communication channel is established by the short range communication component.

8. The system of claim 5, further comprising:
a radio access communication component configured to communicate with the second device via a radio-access network protocol, and
wherein the second communication channel is established by the radio access communication component.

9. The system of claim 1, wherein the physical proximity comprises multiple taps detected by the detection component.

10. A computer readable storage medium, excluding transitory signals, having instructions stored thereon, which when executed by one or more processors of a mobile device, cause the mobile device to:
  detect a physical proximity between the mobile device and multiple other mobile devices;

generate a signal indicative of the physical proximity between the mobile device and the multiple other mobile devices;

responsive to the signal indicative of the physical proximity between the mobile device and the multiple other mobile devices, the mobile device initiating a group data exchange and transmitting a group formation message to each of the multiple other mobile devices;

enable, at the mobile device, a near field communication transponder to receive a data message initiated by the multiple other mobile devices that are part of the group data exchange, wherein the group formation message facilitates creation of communication channels between the mobile device and the multiple other mobile devices over which the data message is to be received from the multiple other mobile devices that are part of the group data exchange.

11. The computer readable storage medium of claim 10, wherein the instructions, when executed by the one or more processors of the mobile device, further cause the mobile device to enable creation of the communication channels between the mobile device and the multiple other mobile devices over which the data is to be received by the mobile device.

12. The computer readable storage medium of claim 10, wherein the instructions, when executed by the one or more processors of the mobile device, cause the mobile device to detect the physical proximity between the mobile device and the multiple other mobile devices by measuring a change in capacitance or resistance at the mobile device.

13. The computer readable storage medium of claim 10, wherein the communication channels include a near field communication channel and the data is received via the near field communication transponder.

14. The computer readable storage medium of claim 10, wherein the instructions, when executed by the one or more processors of the mobile device, further cause the mobile device to:
   enable creation of the communication channels between the mobile device and the multiple other mobile devices over which the data is to be received by the mobile device,
   wherein the communication channels include a short range communication channel configured to communicate with at least one of the multiple other mobile devices via a short range protocol.

15. The computer readable storage medium of claim 10, wherein the instructions, when executed by the one or more processors of the mobile device, further cause the mobile device to:
   enable creation of the communication channels between the mobile device and the multiple other mobile devices over which the data is to be received by the mobile device,
   wherein the communication channels include a radio access communication channel configured to communicate with at least one of the multiple other mobile devices via a radio-access network protocol.

16. The computer readable storage medium of claim 10, wherein the physical proximity between the mobile device and the multiple other mobile devices comprises multiple taps.

17. A system for receiving data at a mobile device, the system comprising:
   detection means for detecting a physical proximity between the mobile device and multiple other mobile devices and generating a signal indicative of the detected physical proximity;
   communication means for communicating via a near field communications protocol;
   reception means for receiving the signal indicative of physical proximity between the mobile device and the multiple other mobile devices and, in response,
   initiating a group data exchange and transmitting a group formation message to each of the multiple other mobile devices,
   enabling the communication means to receive a data message initiated by the multiple other mobile devices that are part of the group data exchange,
   wherein the group formation message facilitates creation of communication channels between the mobile device and the multiple other mobile devices over which data is to be received by the mobile device.

18. The system of claim 17, further comprising a second communication means for communicating via a second communications protocol.

19. The system of claim 18, wherein the second communications protocol comprises a short range protocol or a radio-access network protocol.

20. The system of claim 17, wherein the reception means are further configured to receive the data communication via the second communication means if the communication means become unavailable.

* * * * *